Figure 1:
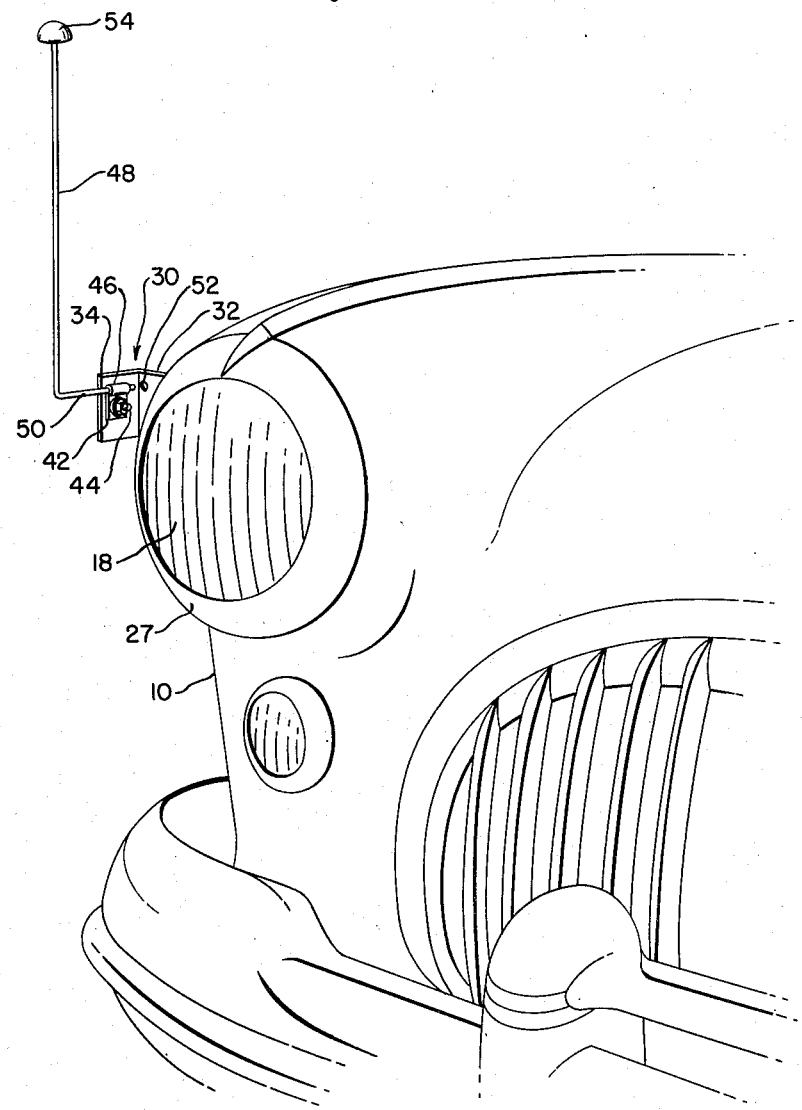

Jan. 5, 1954  T. P. GIBLIN ET AL  2,664,634
POSITION INDICATOR FOR AUTOMOBILES
Filed Jan. 27, 1951  3 Sheets-Sheet 1

INVENTORS
WILLIAM A. ERDON
THOMAS P. GIBLIN
BY
ATTORNEYS

Jan. 5, 1954     T. P. GIBLIN ET AL     2,664,634
POSITION INDICATOR FOR AUTOMOBILES

Filed Jan. 27, 1951     3 Sheets-Sheet 2

INVENTORS
WILLIAM A. ERDON
THOMAS P. GIBLIN
BY
*Kenway, Jenney, Witter & Hildreth.*
ATTORNEYS Jan. 5, 1954   T. P. GIBLIN ET AL   2,664,634
POSITION INDICATOR FOR AUTOMOBILES
Filed Jan. 27, 1951   3 Sheets-Sheet 3
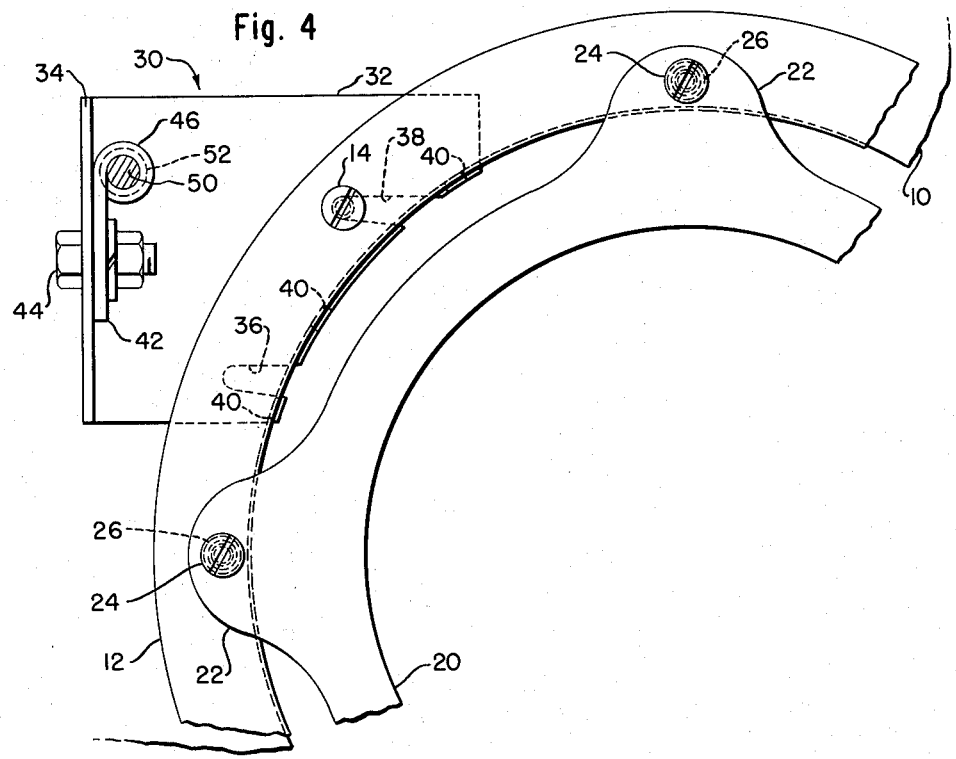
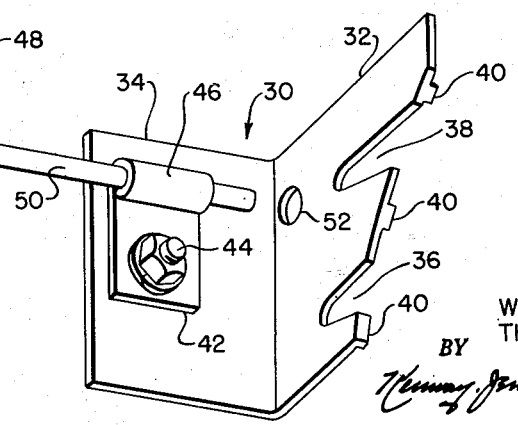
INVENTORS
WILLIAM A. ERDON
THOMAS P. GIBLIN
BY
ATTORNEYS Patented Jan. 5, 1954

2,664,634

UNITED STATES PATENT OFFICE 2,664,634

POSITION INDICATOR FOR AUTOMOBILES

Thomas P. Giblin and William A. Erdon,
Pawtucket, R. I.

Application January 27, 1951, Serial No. 208,122

2 Claims. (Cl. 33—46)

This invention relates to guides or position indicators useful to assist the driver of an automobile in parking and other maneuvers in limited space.

The trend of body design in the automobile industry has been in the direction of relatively high massive hoods and fenders in order to foster the impression of opulent elegance and luxury. An inevitable result is that the driver cannot see diagonally across the hood and fender to determine accurately the location of his right hand forward corner, or determine with any degree of precision his clearance from other objects such as curbs, posts, other cars, etc. The problem is emphasized where it is required to enter or leave a parking place at a curb with other automobiles relatively closely spaced fore and aft.

In the past vertical sighting rods have been attached to the lower edges of the sides of the fenders and also to bumpers and have been employed with considerable success. However, a sight bar secured to the lower edge of a fender must of necessity be so long that it is subject to excessive low-frequency vibration which renders it almost impossible to prevent loosening of the clamp, rattling, and eventual deterioration. Moreover there is so total a lack of uniformity in the designs of bumpers employed by the several automobile manufactures that a clamp fitting all makes is not practicable.

The most important object of our invention is to provide a universally employable sight bar of relatively short lengtth.

An important feature of our invention resides in an angle bracket having one of its members shaped to fit the annular mount employed to secure headlights in the front fenders, the member also being adapted to engage and be held firmly in position by one or more of the screws or bolts used to secure the headlight mount in place.

Compared to the lower edges of a fender or to a bumper, the headlight portion of a front fender is subject to vibration of much smaller amplitude. Moreover the requisite length of a sight bar mounted at the level of the headlight is two or three times less than one extending from the lower fender edge or from the bottoms of the bumper. Hence, regarded as a vibratory system, the sight bar of our invention is resonant at a higher frequency and, being less massive, is ordinarily vibrated through a smaller amplitude.

Figure 2:
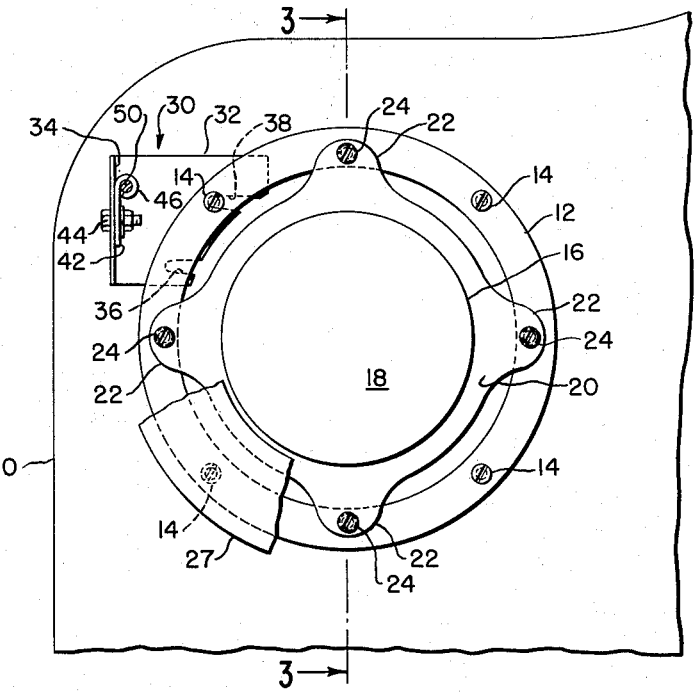
Figure 3:
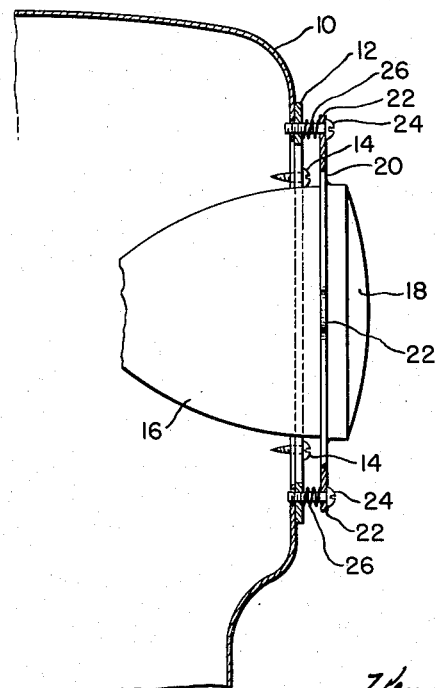

These and other objects and features of our invention will be more readily understood and appreciated from the following detailed description of a preferred embodiment selected for purposes of illustration and shown in the accompanying drawings, in which:

Fig. 1 is a view in perspective of one forward corner of an automobile showing a sight bar constructed in accordance with our invention, Fig. 2 is a view in a front elevation, Fig. 3 is a view in cross-section along the line 3—3 on Fig. 2, Fig. 4 is a view of one quadrant of a headlight and mount showing the sight bar clamp in place, and Fig. 5 is a view in perspective of the sight bar and clamp.

It is universally the practice at present to mount automobile headlights in the forward walls of the front fenders 10. For this purpose a round hole is cut in the fender 10 and surrounded by an annular flange to which there is secured an annular mount or ring 12 fastened by a plurality of screws or bolts 14 varying in number but not disposed on the horizontal or vertical axes of the mount 12. The headlight ordinarily comprises a body 16 of frusto-conical form enclosing a lamp and lamp base (not shown) and terminating in an integral convex lens 18. The body 16 is secured to a flat annular mounting flange 20 having four outwardly extending ears 22 spaced ninety degrees apart and lying on the horizontal and vertical axes of the lamp and mount.

The lamp is secured in place on the mount by four screws 24 working in the ears 22 and embraced by helical compression springs 26 disposed between the ears 22 and the annular mount 12. Hence the lamp is held in place against the tension of the springs 26; consequently the lamp may be adjusted horizontally and vertically by manipulation of the screws 24. The assembly, except for the lens 18 is concealed by a decorative chrome ring 27 detachably secured in place by conventional means (not shown).

The sighting guide of our invention is organized about an angle bracket 30 made of any suitable material and bent to form one member or plate 32 cut to provide an arcuately curved outer edge having approximately the radius of the inner periphery of the annular mount 12. The curved edge is also provided with three inturned lips 40 and two horizontal slots 36 and 38.

The angle bracket 30 also includes an integral forwardly extending plate or member 34 upon which a clamp 42 is pivotally mounted by means of a pin 44. The upper end of the clamp is rolled over as shown at 46 to grip a horizontally extending rod 50 which is integral with a longer vertical rod 48. The rod 50 is held firmly in the clamp 42 but not so tightly that it cannot rotate therein when struck or turned forcibly. Furthermore the rod 50 may be pushed in and out for adjustment, there being a hole 52 in the plate 32 to receive the end of the rod 50 when the device is packed for shipment.

Although we have shown and described a solid rod, it will be obvious that the rod 48 may be constructed of telescoping tubes or of any suitable material. Capping the rod is a button 54 which serves to draw the eye of the driver as a sight and is, of course, to be taken as symbolic of a wide variety of fanciful or artistic objects of metal, plastic, wood or the like. Moreover an object containing a lamp may be mounted on a hollow sight rod and connected to the lighting circuit of the automobile.

In attaching the device of our invention to an automobile, the first step is to remove the chrome ring 27 from the headlight. Then one of the screws 14 is loosened and a screw driver or other implement inserted between the mount 12 and the fender 10 adjacent the loosened screw 14. By manipulation of the screw driver sufficient clearance is obtained for the entry of the member 32; the latter is pushed inwardly until the lips 40 snap over the inner edge of the fender 10. Of course it will be seen that the lips 40 may overlap the inner edge of the fender 10 extending inwardly or they may be designed to extend outwardly and overlap the inner edge of the mount 12. Furthermore it will be seen that the member 32 may be screwed directly to the outer surface of the mount 12. The loose screw 14 engages one of the slots 36 and 38 and is then tightened down to hold the angle bracket 30 firmly in place. The rod 50 is then pulled outwardly until the vertical rod 48 is in line with the extreme end of the automobile (ordinarily the front bumper). If necessary the rod 50 may then be cut off behind the clamp 42 in order that the latter may be rotated freely up and down about the pivot 44. Finally the chrome ring 27 is replaced.

It is important to note that the bracket member 32 occupies substantially less than a quadrant of the mount 12. Quite often the fender will have a longitudinal trim strip of chrome running rearwardly from the side of the lamp at the center, or a trim which runs rearwardly from the top of the lamp at the center. By making the bracket member 32 less than a quadrant of the mount 12 we avoid any possibility that it will lie in the way of the trim or interfere with the designed appearance of the headlight and fender assembly. It is also important to note that the plate 32 is mounted in place without affecting the provision for adjustment of the lamp. Furthermore by providing two slots 36 and 38 we make certain that the bracket 30 may be rotated a slight amount to engage a mounting screw 14.

It will be seen that the sight bar 48 may be rotated about two horizontal axes perpendicular to each other, one the axis of the rolled grip 46 and the other the axis of the pivot 44. Consequently the bar will yield either way to accidental contact or deliberate meddling and so minimize the likelihood of breakage.

Although we have described in detail the preferred embodiment of our invention, we recognize that many variations thereof will suggest themselves to those skilled in the art, and our invention is not limited precisely to the embodiment shown and described but is rather to be measured by the claims appended hereto.

We claim:

1. A position indicator for use in combination with an automobile fender having an annular headlight mount and fasteners securing said mount to an opening in said fender, comprising a bracket having a thin flat member curved at one edge to substantially the curvature of the fender opening and slotted to engage one of the fasteners securing the mount to the fender, said member being dimensioned to occupy less than a quadrant of the annular mount, inturned flanges disposed upon the margin of the curved portion of the bracket member, said flanges engaging the edge of the opening in the fender, and a sight bar secured to said bracket member.

2. A position indicator as defined by claim 1 wherein the bracket member is curved at its edge for mounting above the horizontal center line of the fender opening.

THOMAS P. GIBLIN.
WILLIAM A. ERDON.

References Cited in the file of this patent
UNITED STATES PATENTS

| Number | Name | Date |
|---|---|---|
| 1,248,320 | Hamilton | Nov. 27, 1917 |
| 1,429,166 | Rommer | Sept. 12, 1922 |
| 1,457,426 | Cameron | June 5, 1923 |
| 1,648,278 | Lautenschlager | Nov. 8, 1927 |
| 1,730,979 | Liebchen | Oct. 8, 1929 |
| 1,801,469 | Wagner | Apr. 21, 1931 |
| 1,802,976 | Kueppers | Apr. 28, 1931 |
| 1,811,494 | Conway | June 23, 1931 |
| 1,913,819 | Rileigh | June 13, 1933 |
| 1,964,873 | Dujardin | July 3, 1934 |
| 2,121,525 | Johnson | June 21, 1938 |
| 2,218,486 | Storrie | Oct. 15, 1940 |